(12) United States Patent
Park

(10) Patent No.: US 11,946,597 B2
(45) Date of Patent: Apr. 2, 2024

(54) SOLID STATE HYDROGEN STORAGE SYSTEM

(71) Applicants: Hyundai Motor Company, Seoul (KR); Kia Corporation, Seoul (KR)

(72) Inventor: Ji Hye Park, Seoul (KR)

(73) Assignees: HYUNDAI MOTOR COMPANY, Seoul (KR); KIA MOTORS CORPORATION, Seoul (KR)

(*) Notice: Subject to any disclaimer, the term of this patent is extended or adjusted under 35 U.S.C. 154(b) by 338 days.

(21) Appl. No.: 17/412,750

(22) Filed: Aug. 26, 2021

(65) Prior Publication Data

US 2022/0299163 A1 Sep. 22, 2022

(30) Foreign Application Priority Data

Mar. 17, 2021 (KR) ........................ 10-2021-0034683

(51) Int. Cl.
*F17C 3/00* (2006.01)

(52) U.S. Cl.
CPC ........ *F17C 3/00* (2013.01); *F17C 2203/0607* (2013.01); *F17C 2203/0646* (2013.01); *F17C 2221/012* (2013.01); *F17C 2227/0341* (2013.01)

(58) Field of Classification Search
CPC ........... F28D 2020/0021; F28D 20/003; F28D 20/0056; F17C 11/005; C01B 3/0078
See application file for complete search history.

(56) References Cited

U.S. PATENT DOCUMENTS

| 5,393,616 A | 2/1995 | Mori et al. |
| 5,565,079 A | 10/1996 | Griego |
| 2008/0250804 A1* | 10/2008 | Kubo ................ F28D 7/106 165/44 |
| 2015/0217222 A1* | 8/2015 | Hedin ............... B01J 20/28007 210/660 |
| 2018/0319658 A1* | 11/2018 | Murph ............... B01J 20/0211 |

FOREIGN PATENT DOCUMENTS

| KR | 10-2020-0145878 A | 12/2020 | |
| WO | WO-2019003841 A1 * | 1/2019 | ............. B01J 20/08 |

OTHER PUBLICATIONS

H. H. Law, et al. (1996), A Novel Plating Process for Microencapsulating Metal Hydrides, Journal of The Electrochemical Society, 143(8), Retrieved from https://doi.org/10.1149/1.1837053.
Anand Durairajan, et al. (1999), Cycle life and utilization studies on cobalt microencapsulated AB5 type metal hydride, Journal of Power Sources, 83(1-2). 114-120, Retrieved from https://doi.org/10.1016/S0378-7753(99)00283-9.

(Continued)

*Primary Examiner* — Devon Russell
(74) *Attorney, Agent, or Firm* — Morgan, Lewis & Bockius LLP

(57) ABSTRACT

A solid state hydrogen storage system may include a storage container, a plurality of microcapsules received in the storage container, each of the microcapsules being formed by coating the surface of a solid state hydrogen storage material with a ferromagnetic material, and a coil configured to apply a variable magnetic field to the microcapsules received in the storage container.

6 Claims, 2 Drawing Sheets

(56) References Cited

OTHER PUBLICATIONS

Chen Jun, et al. (1995), Nickel/metal hydride batteries using microencapsulated hydrogen storage alloy, International Journal of Hydrogen Energy, 20(3), 235-237, Retrieved from https://doi.org/10.1016/0360-3199(94)E0023-R.

F. Feng, et al. (2005), Self-discharge characteristics of a metal hydride electrode for Ni-MH rechargeable batteries, International Journal of Hydrogen Energy. 30(12). 1367-1370, Retrieved from https://doi.org/10.1016/j.jhydene.2005.06.013.

F. Feng, et al. (2003), Improved performance of a metal hydride electrode for nickel/metal hydride batteries through copper-coating, Surface and Coatings Technology, 167(2-3). 263-268, Retrieved from https://doi.org/10.1016/S0257-8972(02)00917-9.

Choon-Nyeon Park. (1994), Effect of Ni coating on the properties of metal hydride electrode, Chonnam National University, Retrieved from https://scienceon.kisti.re.kr/srch/selectPORSrchReport.do?cn=TRKO200200016332.

* cited by examiner

SOLID STATE HYDROGEN STORAGE SYSTEM

CROSS-REFERENCE TO RELATED APPLICATION

The present application claims priority to Korean Patent Application No. 10-2021-0034683, filed on Mar. 17, 2021 with the Korean Intellectual Property Office, the entire contents of which is incorporated herein for all purposes by this reference.

BACKGROUND OF THE INVENTION

Field of the Invention

The present invention relates to a system capable of storing hydrogen using a solid state hydrogen storage material.

Description of Related Art

In general, high-pressure gas storage, low-temperature liquefaction storage, and solid state hydrogen storage are used as hydrogen storage methods. Thereamong, solid state hydrogen storage is technology for physically storing hydrogen in a porous solid material or chemically storing hydrogen through atomic bonding between a solid material and hydrogen. It is possible to store hydrogen at approximately normal pressure, whereby it is possible to guarantee higher safety than high-pressure gas storage technology. Furthermore, it is possible to store hydrogen at approximately normal temperature, whereby it is not necessary to maintain a very low temperature, unlike low-temperature liquefaction storage technology.

Technology for chemically storing hydrogen through atomic bonding between hydrogen and a solid material exhibits high spatial utilization, since storage capacity per unit volume is large. There are hydrogen storage alloys, such as AB, AB2, AB5, and BCC, and complex metal hydrides, such as alanate and amide, as solid state hydrogen storage materials now under active research.

When hydrogen is stored in the solid state hydrogen storage material by occlusion, heat of reaction is generated, i.e., exothermic reaction occurs. When hydrogen is discharged from the solid state hydrogen storage material, ambient heat is absorbed, i.e., endothermic reaction occurs.

Consequently, appropriate cooling is necessary when hydrogen is stored in the solid state hydrogen storage material by occlusion, and appropriate heating is necessary when hydrogen is discharged from the solid state hydrogen storage material.

To the present end, a conventional solid state hydrogen storage system includes a heating device and a cooling device.

The information included in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a solid state hydrogen storage system configured for storing hydrogen in a solid state hydrogen storage material by occlusion, discharging hydrogen to be used in a hydrogen fuel cell vehicle or for energy storage, and simultaneously heating hydrogen storage materials having hydrogen stored therein when the hydrogen is discharged, whereby it is possible to remarkably improve hydrogen discharge efficiency.

In accordance with an aspect of the present invention, the above and other objects may be accomplished by the provision of a solid state hydrogen storage system including a storage container, a plurality of microcapsules received in the storage container, each of the microcapsules being formed by coating the surface of a solid state hydrogen storage material with a ferromagnetic material, and a coil configured to apply a variable magnetic field to the microcapsules received in the storage container.

The ferromagnetic material, with which the surface of the solid state hydrogen storage material is coated, may include at least one of Ni or Co.

The microcapsule may be formed by coating the surface of the solid state hydrogen storage material with a thermally conductive material and coating the surface of the thermally conductive material with the ferromagnetic material.

The thermally conductive material may include at least one of Cu, Al, or Ag.

The solid state hydrogen storage system may further include a cooling tube, in which a coolant flows to cool the microcapsules received in the storage container.

The storage container may include an internal barrel configured to receive the microcapsules and an external barrel disposed to wrap the internal barrel with a gap between the internal barrel and the external barrel, and the coil may be disposed between the internal barrel and the external barrel.

The cooling tube, in which the coolant flows, may be provided between the internal barrel and the external barrel to cool the microcapsules received in the internal barrel.

The cooling tube, in which the coolant flows, may be provided to extend through the interior of the internal barrel to cool the microcapsules received in the internal barrel.

In accordance with another aspect of the present invention, there is provided a microcapsule for hydrogen storage, the microcapsule including a solid state hydrogen storage material and a ferromagnetic material formed on the surface of the solid state hydrogen storage material by coating.

The ferromagnetic material formed on the surface of the solid state hydrogen storage material by coating may include at least one of Ni or Co.

The microcapsule may further include a thermally conductive layer disposed between the solid state hydrogen storage material and the ferromagnetic material, the thermally conductive layer being made of a thermally conductive material.

The thermally conductive material forming the thermally conductive layer may include at least one of Cu, Al, or Ag.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
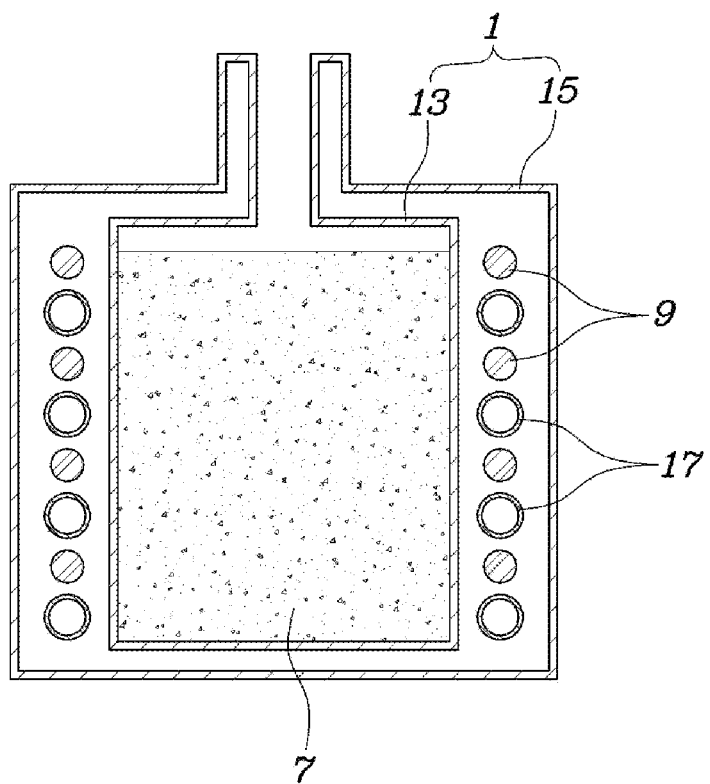
FIG. 1 is a view exemplarily illustrating a solid state hydrogen storage system according to various exemplary embodiments of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Specific structural or functional descriptions of the exemplary embodiments of the present invention disclosed in the present specification or this disclosure are provided only for illustrating embodiments of the present invention. Embodiments of the present invention may be realized in various forms, and should not be interpreted to be limited to the exemplary embodiments of the present invention disclosed in the present specification or this disclosure.

Since the exemplary embodiments of the present invention may be variously modified and may have various forms, specific embodiments will be shown in the drawings and will be described in detail in the present specification or this disclosure. However, the exemplary embodiments according to the concept of the present invention are not limited to such specific embodiments, and it should be understood that the present invention includes all alterations, equivalents, and substitutes that fall within the idea and technical scope of the present invention.

It will be understood that, although the terms "first", "second", etc. may be used herein to describe various elements, corresponding elements should not be understood to be limited by these terms, which are used only to distinguish one element from another. For example, within the scope defined by the present invention, a first element may be referred to as a second element, and similarly, a second element may be referred to as a first element.

It will be understood that, when a component is referred to as being "connected to" or "coupled to" another component, it may be directly connected to or coupled to the other component, or intervening components may be present. In contrast, when a component is referred to as being "directly connected to" or "directly coupled to" another component, there are no intervening components present. Other terms that describe the relationship between components, such as "between" and "directly between" or "adjacent to" and "directly adjacent to", may be interpreted in the same manner.

The terms used in the present specification are provided only to explain specific embodiments, but are not intended to restrict the present invention. A singular representation may include a plural representation unless it represents a definitely different meaning from the context. It will be further understood that the terms "comprises", "has" and the like, when used in the present specification, specify the presence of stated features, numbers, steps, operations, elements, components or combinations thereof, but do not preclude the presence or addition of one or more other features, numbers, steps, operations, elements, components, or combinations thereof.

Unless otherwise defined, all terms, including technical and scientific terms, used in the present specification have the same meanings as those commonly understood by a person having ordinary skill in the art to which various exemplary embodiments of the present invention pertains. It will be further understood that terms, such as those defined in commonly used dictionaries, should be interpreted as having meanings consistent with their meanings in the context of the relevant art and the present invention, and are not to be interpreted in an idealized or overly formal sense unless expressly so defined herein.

Reference will now be made in detail to the exemplary embodiments of the present invention, examples of which are illustrated in the accompanying drawings. Wherever possible, the same reference numbers will be used throughout the drawings to refer to the same or like parts.

Referring to FIG. 1, FIG. 2, FIG. 3, and FIG. 4, a solid state hydrogen storage system according to various exemplary embodiments of the present invention includes a storage container 1, a plurality of microcapsules 7 received in the storage container 1, each of the microcapsules being formed by coating the surface of a solid state hydrogen storage material 3 with a ferromagnetic material 5, and a coil 9 configured to apply a variable magnetic field to the microcapsules 7 received in the storage container 1.

That is, in the hydrogen storage system according to various exemplary embodiments of the present invention, in the state in which the microcapsules 7, i.e., the solid state hydrogen storage materials 3, the surface of each of which is coated with the ferromagnetic material 5, are received in the storage container 1, as described above, hydrogen is stored in the microcapsules 7 received in the storage container 1 by occlusion. When hydrogen is discharged, a magnetic field generated as the result of electricity being supplied to the coil 9 is applied to the microcapsules 7, whereby the occluded hydrogen is easily and smoothly discharged by induction heating of the microcapsules 7.

When the magnetic field applied to the microcapsules 7 is varied, heat is generated from the ferromagnetic material coating layer of each of the microcapsules 7 due to magnetic hysteresis loss.

To incur magnetic hysteresis loss, therefore, it is necessary to periodically vary the magnetic field applied to the microcapsules 7. To the present end, a method of supplying alternating current to the coil 9 may be used.

Figure 2:
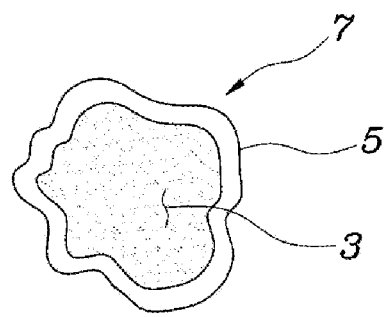
FIG. 2 is a view describing the structure of a microcapsule according to various exemplary embodiments of the present invention.

For reference, FIG. 2 shows the section of a microcapsule 7 formed by coating the surface of a solid state hydrogen storage material 3 with a ferromagnetic material 5 as various exemplary embodiments of the present invention. The microcapsule 7 may be configured to have any of various configurations, such as powder or pellet.

Here, a complex metal hydride including amide, such as $LiNH_2$ or $Mg(NH_2)_2$, and alanate, such as $NaAlH_4$, or a hydrogen storage alloy, such as AB5 ($LaNi_5$), AB (TiFe), AB2 ($TiMn_2$), or BCC, may be used as the solid state hydrogen storage material 3.

Figure 3:
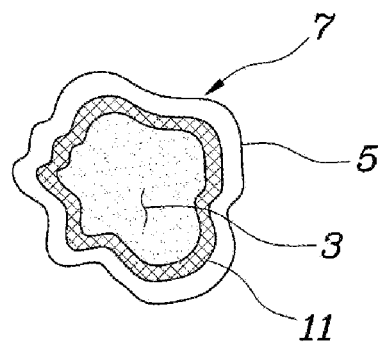
FIG. 3 is a view describing a modification of the microcapsule according to various exemplary embodiments of the present invention.

FIG. 3 shows a modification of the microcapsule 7. The microcapsule 7 of FIG. 3 is formed by coating the surface of the solid state hydrogen storage material 3 with a thermally conductive material and coating the surface of the thermally conductive material with the ferromagnetic material 5.

That is, a thermally conductive layer 11 made of a thermally conductive material is further provided between the solid state hydrogen storage material 3 and the ferromagnetic material 5.

The thermally conductive material may include at least one of Cu, Al, or Ag.

That is, it is preferable for a material having high thermal conductivity equivalent to at least Cu to be used as the thermally conductive material.

In the case in which the microcapsule 7 is provided with a thermally conductive layer 11 made of a thermally conductive material, as described above, heat generated from the ferromagnetic material coating layer is more smoothly transferred to the solid state hydrogen storage material 3, whereby the hydrogen occluded in the solid state hydrogen storage material 3 may be more smoothly discharged.

Meanwhile, generation of heat due to eddy current occurs in the microcapsule 7, in addition to generation of heat due to magnetic hysteresis loss caused by periodically variable magnetic force.

That is, in the case in which the ferromagnetic material coating layer is made of a ferromagnetic material 5 or in the case in which the thermally conductive layer 11 is made of an electrically conductive metal, eddy current is generated due to a change in magnetic force, whereby the material generates heat due to electrical resistance thereof.

When a periodically variable magnetic field is applied to the microcapsules 7 according to various exemplary embodiments of the present invention, therefore, generation of heat due to eddy current also occurs in addition to generation of heat due to magnetic hysteresis loss, whereby it is possible to more effectively heat the solid state hydrogen storage materials 3.

For reference, generation of heat due to magnetic hysteresis loss is much greater than generation of heat due to eddy current, and therefore induction heating by a change in magnetic field is dominated by magnetic hysteresis loss.

Furthermore, at the time of occlusion of hydrogen, the thermally conductive layer 11 is also configured to effectively cool the solid state hydrogen storage material 3 in the microcapsule 7 due to high thermal conductivity thereof.

Since the microcapsules 7 received in the storage container are simultaneously heated, a conventional thermal transfer structure for improvement of heat transfer efficiency, such as a fin or a mesh made of a separate heat transfer material, is not needed. Furthermore, the amount of hydrogen which is discharged on the basis of energy input for hydrogen discharge is increased, whereby it is possible to greatly improve hydrogen discharge efficiency.

Since only heating reaction is induced by the magnetic field applied to the microcapsules 7, it is preferable for the solid state hydrogen storage system according to various exemplary embodiments of the present invention to further include a cooling tube 17, in which a coolant flows to cool the microcapsules 7 received in the storage container 1.

That is, in the exemplary embodiment of FIG. 1, the storage container 1 includes an internal barrel 13 configured to receive the microcapsules 7 and an external barrel 15 disposed to wrap the internal barrel 13, the coil 9 is disposed between the internal barrel 13 and the external barrel 15 in a spiral shape to wrap the internal barrel 13, and a cooling tube 17, in which a coolant flows, is provided between the internal barrel 13 and the external barrel 15 to cool the microcapsules 7 received in the internal barrel 13.

In the solid state hydrogen storage system according to various exemplary embodiments of the present invention, various devices, such as a pump configured to pump the coolant flowing into the cooling tube 17 and a valve, may be connected to the cooling tube 17, and a power supply device configured to supply electricity to the coil 9 may be further provided.

Figure 4:
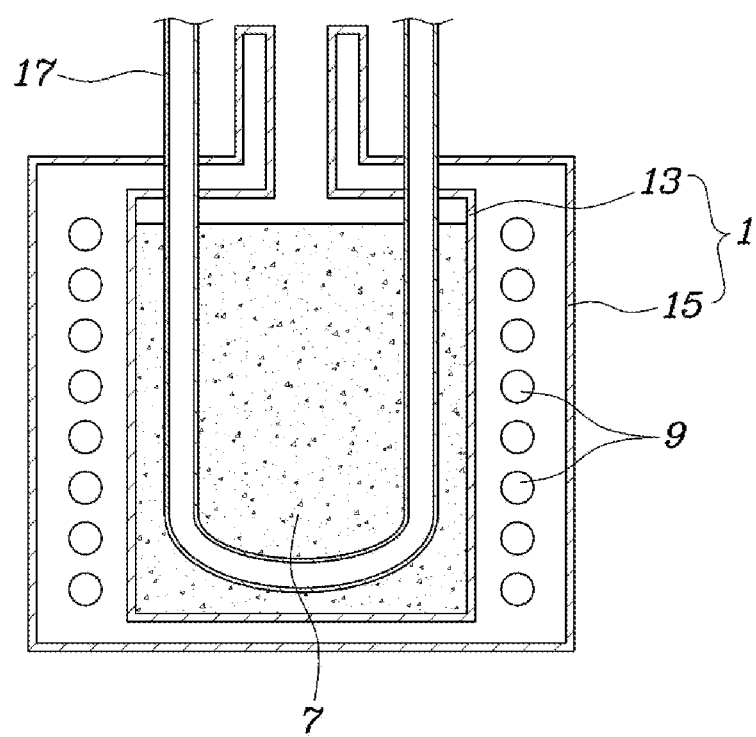
FIG. 4 is a view showing another exemplary embodiment of the solid state hydrogen storage system according to various exemplary embodiments of the present invention.

FIG. 4 shows another exemplary embodiment of the solid state hydrogen storage system according to various exemplary embodiments of the present invention, which has a structure in which the cooling tube 17, in which the coolant flows, is provided to extend through the interior of the internal barrel 13 to cool the microcapsules 7 received in the internal barrel 13.

That is, the system of FIG. 4 is identical in construction to the system of FIG. 1 except for the installation structure of the cooling tube 17.

Alternatively, the system may be configured to have both the installation structure of the cooling tube 17 shown in FIG. 1 and the installation structure of the cooling tube 17 shown in FIG. 4, or the system may be configured such that the coolant flows around the entire internal barrel 13.

In the solid state hydrogen storage system according to various exemplary embodiments of the present invention, as described above, non-contact type heating is performed by applying the magnetic field to the microcapsules 7, whereby the degree of freedom in designing the shape and scale of the system is high, and the system is advantageous to an increase in capacity and diversification of applied fields.

As is apparent from the above description, according to various exemplary embodiments of the present invention, hydrogen is stored in microcapsules, each of which is formed by coating the surface of a solid state hydrogen storage material with a ferromagnetic material, by occlusion, and the hydrogen is discharged to be used in a vehicle, etc. When the hydrogen is discharged, a magnetic field is applied to the microcapsules, and the solid state hydrogen storage materials forming the microcapsules are simultaneously heated by induction heating, whereby it is possible to greatly improve hydrogen discharge efficiency.

Furthermore, since the solid state hydrogen storage material is coated with the ferromagnetic material to be used in a form of a microcapsule, as described above, it is possible to prevent the solid state hydrogen storage material from being poisoned by impure gas introduced together with hydrogen gas and to prevent scattering of particulates due to repeated occlusion and discharge of hydrogen.

Also, in the solid state hydrogen storage system according to various exemplary embodiments of the present invention, non-contact type heating is performed by applying the magnetic field to the microcapsules, whereby the degree of freedom in designing the shape and scale of the system is high, and the system is advantageous to an increase in capacity and diversification of applied fields.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A solid state hydrogen storage system comprising:
    a storage container;
    a plurality of microcapsules received in the storage container, each of the microcapsules being formed by coating a surface of a solid state hydrogen storage material with a ferromagnetic material; and
    a coil configured to apply a variable magnetic field to the microcapsules received in the storage container;
    wherein the storage container includes an internal barrel configured to receive the microcapsules and an external barrel disposed to wrap the internal barrel with a gap between the internal barrel and the external barrel,
    wherein the coil is disposed between the internal barrel and the external barrel in the gap,
    wherein a cooling tube, in which a coolant flows, is provided between the internal barrel and the external barrel to cool the microcapsules received in the internal barrel, and
    wherein the cooling tube is in a shape of spiral, and
    wherein the coil is disposed between pitches of the shape of the spiral.

2. The solid state hydrogen storage system according to claim 1, wherein the ferromagnetic material, with which the surface of the solid state hydrogen storage material is coated, includes at least one of Ni or Co.

3. The solid state hydrogen storage system according to claim 1, wherein the microcapsules are formed by coating the surface of the solid state hydrogen storage material with a thermally conductive material and coating a surface of the thermally conductive material with the ferromagnetic material.

4. The solid state hydrogen storage system according to claim 3, wherein the thermally conductive material includes at least one of Cu, Al, or Ag.

5. The solid state hydrogen storage system according to claim 1, further including a cooling tube, in which a coolant flows to cool the microcapsules received in the storage container.

6. The solid state hydrogen storage system according to claim 1, wherein the cooling tube, in which the coolant flows, is provided to extend through an interior of the internal barrel to cool the microcapsules received in the internal barrel.

* * * * *